Figure 3:
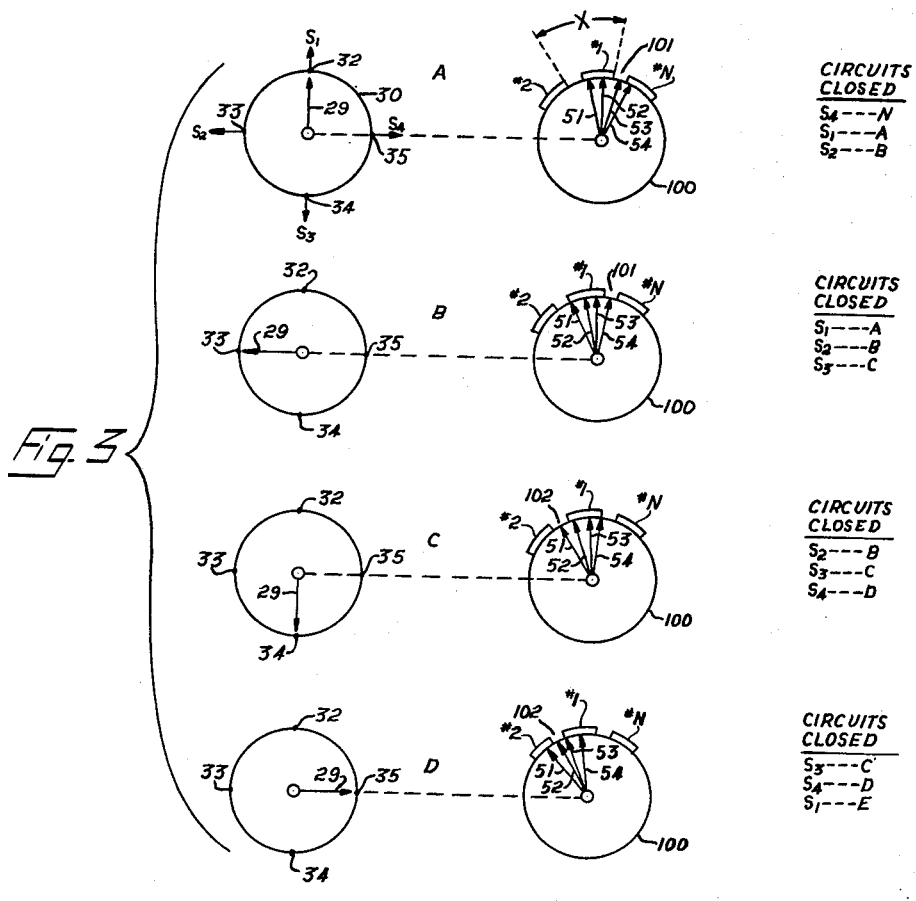

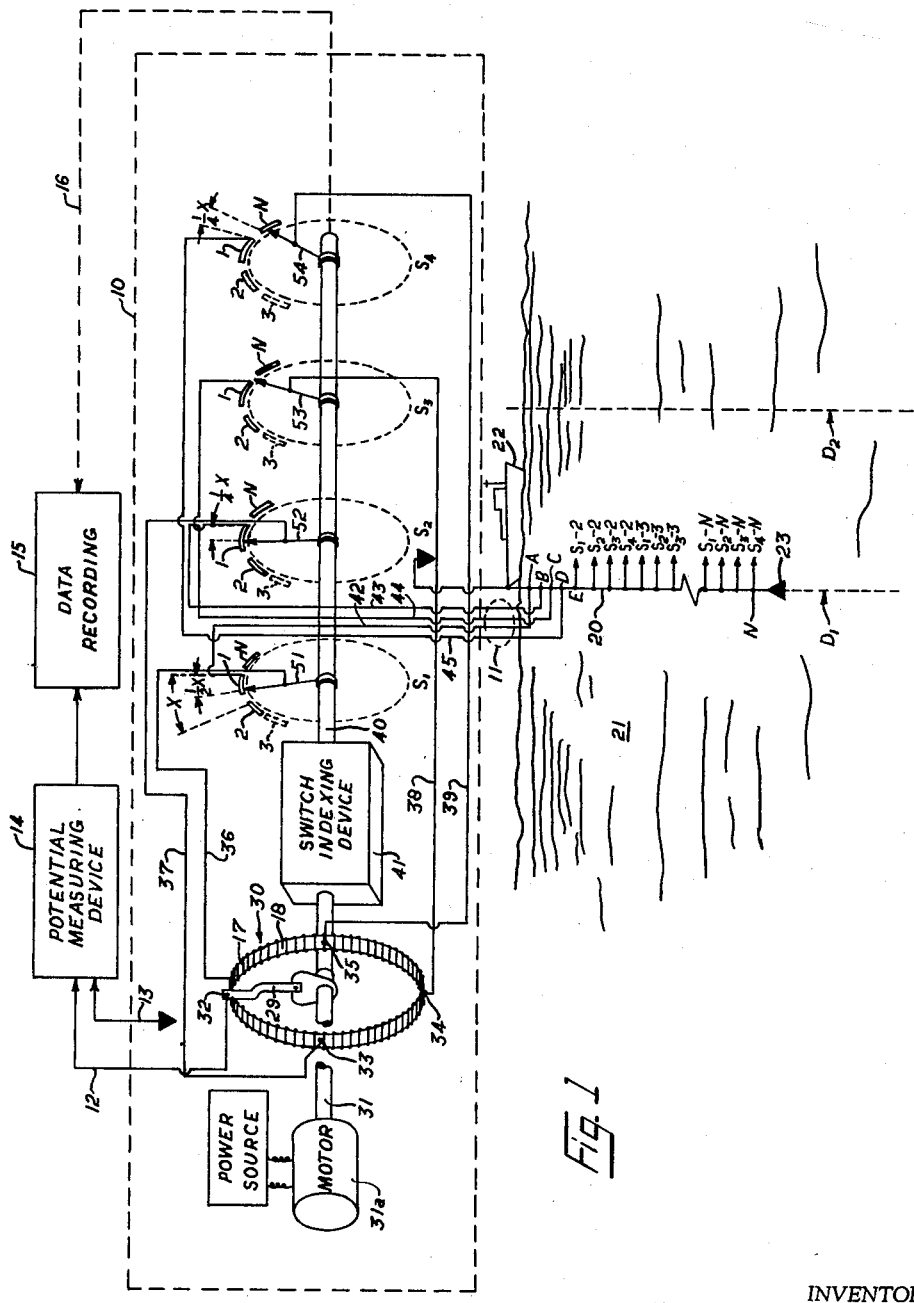

INVENTORS
WILLIAM B. HUCKABAY &
WILLIAM H. PARKER
BY
Dunlap, Laney & Hubbard
ATTORNEYS

United States Patent Office 3,180,148
Patented Apr. 27, 1965

3,180,148
CONTOUR TEMPERATURE RECORDER
William B. Huckabay and William H. Parker, Dallas, Tex., assignors, by mesne assignments, to Rayflex Exploration Company, Dallas, Tex., a corporation of Texas
Filed Feb. 2, 1962, Ser. No. 170,656
5 Claims. (Cl. 73—341)

This invention relates generally to an improved potential monitoring device, and more particularly, but not by way of limitation, to an improved method and apparatus for obtaining the temperature profile of a body of water, such as the ocean.

As it is well known in the art, it is common practice to measure the temperature at various depths in the ocean by mounting a large number of thermocouples on a cable or other suitable device and lowering the cable into the water by weights or other suitable means for retaining the cable in a substantially vertical position. The thermocouples lowered into the water will assume the temperature surrounding the respective thermocouple and will generate a potential which corresponds to the water temperature in the vicinity of the respective thermocouple. In order to make a graph or chart of the variations in the temperature of the water at the various depths, it is necessary to sequentially sample each of the thermocouple voltages progressively downwardly from the uppermost thermocouple, or progressively upwardly from the lowermost thermocouple. These voltages, as sampled, are then either stored in a computer in the form of punched tape, cards, or other suitable means, or are recorded on a chart which shows the temperature variation for various depths in the ocean versus distance.

The device heretofore used for sampling the various thermocouples comprises a circular resistance element having a tap thereon for each of the thermocouples, and with the taps being equally spaced about the circumference of the circular resistance element. Each tap is connected to a thermocouple in sequence down the cable, that is, the first tap on the resistance element is connected to the first thermocouple; the second tap to the second thermocouple, etc. A potential measuring device is connected to the rotating contactor of the resistance element. As the contactor is rotated, it moves over each of the various equally spaced taps and samples each thermocouple voltage, as well as the potential gradient between successive taps. The potential measuring device receives the sampled potential from the rotating contactor and converts the sampled voltage into a useable output, such as a binary coded signal or a plurality of pulses which may be applied to a flying spot type recorder.

The circular resistance element heretofore used has several features which make it undesirable. First, the resistive element must have a separate tap for each thermocouple used. In a system of the type described, fifty or one hundred temperature samples would result in a tapped resistive element becoming prohibitively expensive, and would become prone to failures from open contacts or damage to the elements by continued usage. This type of system fails for another reason in that it is mandatory that each tap be connected to a thermocouple, or else the system will not function properly. This requirement obviously results in a system wihch is completely rigid in that a specific number of thermocouples must always be used and functioning with a particular circular resistance element, or else the system is rendered inoperable.

It is therefore an object of this invention to provide a sampling device that is extremely economical to build and maintain.

It is a further object of this invention to provide an extremely reliable instrument.

It is a still further object of this invention to provide an instrument that is readily adaptable to any selected number of thermocouple sets and also a device that may permit increasing the number of thermocouple sets without undue expense or time lost in the conversion.

A further object of this invention is to eliminate the extremely expensive complex multi-tapped resistive element and substitute a fairly cheap resistive element which requires only a few taps thereon.

In accordance with the present invention, the foregoing and other objects are provided by the unique cooperation between a plurality of switching elements and a circular resistance element having a relatively few taps thereon. The resistance element comprises a linear circular resistance extending through 360 degrees. The contactor or wiper of the circular resistance element is rotated by a motor, and the arms of the switching elements may be turned by the same motor at a lesser rate. Any number of switching elements may be used, and the number of switching elements depends upon the number of potentials to be sampled. The taps on the circular resistance element are preferably the same as the number of switches selected, and the taps are equally spaced around the circular resistance element. Each contact of each switching element is connected to a thermocouple or other potential measuring source. When the potential sampling system is used for underwater temperature measurements, the first contact of each switching element is connected in sequence to the first series of thermocouples on the cable; the second set of contacts for each switching element are connected in sequence to the thermocouples following those connected to the first set of contacts. The third and following contacts are connected in like sequence. The arms of the switching elements are, as indicated, driven by the motor that drives the contactor of the circular resistance element, with the angular velocity of the switch arms being less than the angular velocity of the circular resistance contactor. For example, the contactor of the resistance element must rotate by several of the taps on the resistance element before one of the switching element arms passes from the first contact to the second contact. The output voltage from the rotating contactor of the circular resistance element is continuously measured by a potential measuring device, the output of which is then supplied to the input of the data recording system. Position information from the motor shaft is also supplied to the data recording system so that correlated data may be obtained. The data recording system may comprise a binary computer recording information on records such as cards or punched tape, or may comprise a flying spot recording system which directly records the output of the potential measuring device to form a profile of the temperature of the water in which the thermocouples are immersed.

Other objects, features and advantages of the invention will become apparent upon reference to the specification and accompanying drawings.

Figure 2:
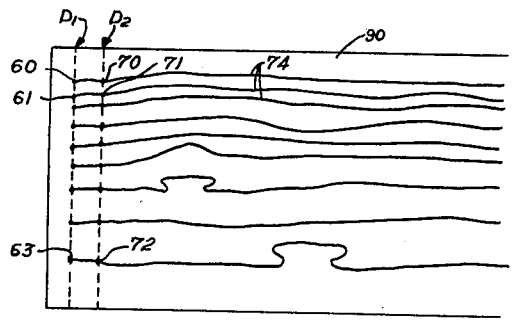

In the drawings:
FIGURE 1 is a schematic diagram of the entire sampling system.
FIGURE 2 is an illustration of a chart that might be obtained from recording the information obtained from the system shown in FIG. 1, when the system includes a flying spot recorder, and
FIGURES 3 (A through D) show the relation of the switch arms of the selector switches for various positions of the resistance element contactor.

Referring to the drawings in detail, and particularly FIG. 1, a voltage sampling system is shown wherein the potential sampling device 10 has an input cable 11 and a pair of output wires 12 and 13 which are connected to a potential measuring device 14. The output of the potential measuring device 14 is connected to the input of a data recording system 15. Position information is provided through a mechanical coupling 16 to the data recording system 15.

The particular environment in which the potential sampling device is normally used is in the measurement of variations in temperature at various depths in the ocean. To illustrate the preferred use, the cable 20 is shown immersed in the ocean 21. One end of cable 20 is attached to a ship 22, while the other end is maintained in a substantially vertical relation with the surface of the water by any suitable means, such as a weight 23. A plurality of thermocouples A, B, C, D, through N are attached to the cable 20 in equally spaced relation along the cable. Each thermocouple provides an indication of the temperature of the water in the immediate vicinity thereof. Each of the thermocouples is connected by a conductor to cable 11.

The potential sampling device 10 comprises a continuous circular resistance element 30 and a bank of switches $S_1$ through $S_4$. The resistance element 30 may be formed by wrapping a continuous resistance type wire 17 about a circular insulator 18, or by forming a continuous carbon type strip. Either method is adapted to have a contactor or wiper 29 pass over the surface and make electrical communication with the resistance element. A shaft 31 extends through the resistance element 30 to support the rotating contactor 29. One end of the shaft 31 is connected to the output of a suitable motor 31a. The motor 31a is operated by a suitable power source in a conventional manner.

The switches $S_1$ through $S_4$ are aligned with the element 30 and are secured to a suitable chassis (not shown). A shaft 40 extends axially through the center of each of the switches and has one end connected to the output of a switch indexing device 41. The input of the switch indexing device 41 is connected to the remaining end of the shaft 31. The rotating arm 51 of the switch $S_1$, through the arm 54 of the switch $S_4$, are secured to the shaft 40 by any suitable insulating means.

Each of the switches comprises a plurality of contacts 1, 2, 3, through N mounted in circumferentially spaced relation around the respective switch arm. The contacts of each switch are adapted to be engaged by the corresponding switch arm 51 through 54. The contacts are further designed so that, for example, as switch arm 51 is rotated it will continue to make contact with one of the contacts until shortly before it engages the next successive contact. Thus, the circuit connected through contact 1 and switch arm 51, for example, will be made until just prior to the time the switch arm 51 engages the contact 2. Referring to switch $S_1$ in particular, since all the switches are substantially identical, the angle "X" that the switch must pass through before making contact with contact 2 is always less than one complete revolution of the contactor 29. Therefore, the switch indexing device 41 must be so adjusted or selected that less than 360 degrees rotation of the contactor 29 will cause switch arm 51 to pass through angle "X." However, indexing device 41 must also be adjusted so that a full 360 degrees of rotation of the contactor 29 will cause the switch arm to make contact with contact 2. Thus, for each rotation of contactor 29, the switch arm 51 will move from contact 1 to contact 2. It should also be noted here, however, that either the stationary contacts or switch arms of the switches $S_2$ through $S_4$ are angularly retarded or offset from the contacts or arms, respectively, of switch $S_1$. For example, the arm 52 of switch $S_2$ is retarded (offset backwards from arm 51 in the direction of rotation of the switch arm 52) an angle equal to one fourth of angle "X." The arms of $S_3$ and $S_4$ are progressively retarded. This arrangement controls the timing of sampling of the various potentials from the thermocouples as will be described.

In order to properly sample the potentials from switches $S_1$ through $S_4$, a plurality of taps 32 through 35 are electrically connected to the circular resistance element 30. The number of taps 32 through 35 preferably corresponds to the number of switches $S_1$ through $S_4$. The taps are also mounted equal distances apart around the resistance element 30, resulting in an equal number of angular degrees between adjacent pairs of the taps 32 through 35. If more switches were to be added, additional taps corresponding in number to the switches added are preferably attached to the element 30, with each adjacent pair being equally spaced about the element 30, in order to retain the same speed of rotation of the contactor 29, that is, the same cycle time.

A wire 36 connects the switch arm 51 with the tap 32. Correspondingly, wires 37, 38 and 39 connect the switch arms 52, 53 and 54 to the taps 33, 34 and 35 respectively.

For ease in understanding the drawing, only a single set of wires is shown connecting the thermocouples A through D with switches $S_1$ through $S_4$. Referring to the conductors in detail, it is seen that thermocouple A is connected through a conductor 42 to contact 1 of the switch $S_1$. Thermocouple B is connected through a conductor 43 to contact 1 of the switch $S_2$. A conductor 44 connects thermocouple C to the contact 1 of the switch $S_3$, and a conductor 45 connects the thermocouple D to the contact 1 of switch $S_4$. Each of the thermocouples following thermocouple D is connected as indicated by the letters and numbers in the drawing. That is, the subsequent thermocouple E is shown connected to contact 2 of switch $S_1$. The last thermocouple N is connected to the N contact on the switch $S_4$.

In order to relate information as to which thermocouple is being sampled, position information is supplied to the data recording system 15 through a mechanical shaft 16. Any other suitable means can be used to provide position information, such as a position switch or a servo-type system which is responsive to angular positions of the shaft 40.

*Operation*

The operation of the system will be explained with particular reference to its use in temperature measurements in oceanography studies. It is of course obvious that the invention can be used for the sampling of potentials under any circumstances similar to those previously described. It is the full intent of this invention to claim any such additional use of the system.

With the contactor 29 and the arms 51 through 54 in the positions shown in FIG. 1, rotation of the contactor 29 from the initial position until it is over tap 32 will first measure the potential of the voltage appearing at the tap 32. This potential is that appearing on the contact 1 of switch $S_1$ and this contact is connected to the thermocouple A. Thus, the potential being sampled by the contactor 29 is that of the thermocouple A. The sample of the potential measured is then applied to the potential measuring device 14 and converted to information suitable for the data recording system 15.

As the contactor 29 moves over the element 30 toward the tap 33, the contactor reads the potential gradient between the taps 32 and 33. And, since the switch arm 52 of the switch $S_2$ is engaged with the respective contact 1 well before the contactor passes the tap 32, and the arm 52 is connected to the tap 33, this gradient is a linear interpretation of the temperature gradient between the thermocouples A and B. As the contactor 29 continues to turn around the element 30, the temperature gradients between the thermocouples B and C, and C and D appear as potential gradients on contactor 29.

As previously indicated, the stationary contacts or the arms of the switches $S_2$, $S_3$ and $S_4$ are successively retarded. This arrangement is provided in order that the potentials supplied to the taps 32, 33, 34 and 35 will be changed sufficiently ahead of the contactor 29 that the potential of the contactor will be affected only by the potentials provided by two adjacent thermocouples. In a preferred embodiment, the stationary contacts and arms of the switches $S_1$ through $S_4$ are arranged and constructed such that the potential applied to a particular tap on the element 30 will be dropped after the contactor 29 has turned 135 degrees past the particular tap; and a potential to be read from a particular thermocouple will be imposed on a tap when the contactor 29 is 135 degrees ahead of the respective tap.

Referring to FIG. 3, circular resistance element 30 is shown with its taps 32–35, and contactor 29. A composite switch 100 is shown for the switches $S_1$–$S_4$ for ease is understanding the arrangement and operation of the switches. In FIGURE 3A, when contactor 29 is over tap 32 (which is electrically connected to the arm 51 of switch 1) switch arm 53 (switch $S_3$) is located in the gap 101 between contact #1 and contact #N. The switch arm 52 (switch $S_2$) is ¼X counterclockwise from arm 53; and switch arm 51 is ½X from switch arm 53. Switch arm 54 is ¼X clockwise from arm 53.

In operation, when contactor 29 of resistance element 30 is moving over tap 32, switches $S_4$, $S_1$ and $S_2$ are sampling thermocouples N, A, and B respectively. As contactor 29 moves over tap 33 (see FIG. 3B), contacts 51, 52 and 53 are contacting their respective contacts #1 while arm 54 is now in gap 101. Taps 32, 33 and 34 are then being supplied potentials from thermocouples A, B and C.

In FIG. 3C, switch arm 51 has moved to gap 102 while arms 52, 53 and 54 are connecting thermocouples B, C and D to taps 33, 34 and 35 of resistance element 30.

In FIG. 3D, arm 52 has moved to gap 102 while arm 51 has made contact with contact #2. Arms 53, 54 are still contacting contact #1. Thermocouples C, D and E are now connected to taps 34, 35 and 32. The cycle will then be continued for all the switch contacts.

Thus, only three of the taps on the element 30 will be energized at any one time and these will be energized by three adjacent thermocouples. With this arrangement, the potential on the contactor 29 will be a representation of the temperature gradient from the upper thermocouple to the lowermost thermocouple in each cycle of operation of the device. The potential on the contactor 29 will thus be a continuous or analog function and this potential is, as indicated, fed to the potential measuring device 14 for subsequent recording by the recording system 15. The coupling 16 may drive the record medium (not shown) of the recording system 15 to correlate the data with the thermocouples being sampled.

The switch indexing device 41 is of a type which continuously rotates the shaft 40 and hence the arms of the various switches $S_1$ through $S_4$. With this type of operation, the switches $S_1$ through $S_4$ will be subjected to a minimum wear and will have a maximum service life.

In a preferred embodiment of this invention, the potential measuring device 14 is a servo system which provides a pulse output when the potential on the contactor 29 changes a predetermined amount, such as a potential representative of one degree C. In this form of the invention, the recording system 15 is a flying spot recorder and the pulse output of the device 14 is fed to the printing blade of the flying spot recorder. Also, in this form, the coupling 16 is connected to the drum of the flying spot recorder. With this type of system, the record provided is in the form of a temperature profile as illustrated in FIG. 2.

As previously explained, the potential on the contactor 29 is representative of the temperature variations along the line of the thermocouples A through N. In analyzing a chart such as shown in FIG. 2, let it be assumed that the potential measuring device 14 is set to provide an output pulse each time the potential on the contactor 29 varies an amount equal to one degree C. Each output pulse of the device 14 will operate the recording system 15, thus providing a series of dots along the width of the chart, providing, of course, that the temperature of the water varies several degrees from the upper thermocouple A to the lower thermocouple N. During the recording of the first set of temperature recordings $D_1$, when the temperature of the water varies more than one degree C, a dot 60 is provided on the chart as illustrated in FIG. 2. The next time the temperature of the water varies one degree C, a subsequent dot 61 is formed on the chart directly below the dot 60. It will also be noted that the dot 61 will be located a distance below the dot 60 indicative of the depth of the water between these two temperature points. It should be noted, however, that the dots 60 and 61 are only by coincidence at the levels of the first two thermocouples A and B, hence the exact location of the depths indicated by the dots 60 and 61 is not determined from the chart.

When the last of the series of readings (to the Nth thermocouple) have been read and the last dot 63 has been plotted representing the last degree change in temperature, the ship 22 is moved to a new location $D_2$ a short distance from the original location $D_1$, and a new set of readings 70, 71 . . . 72 plotted. The process is repeated until the required distance has been covered and plotted. Each line of dots may then be contoured as indicated at 74. However, the distance between successive sampling points, such as $D_1$ and $D_2$ is normally so small compared with the scale of the chart that the dots corresponding with each temperature level effectively form a profile.

From the foregoing it will be apparent that the present invention provides a sampling device that is extremely economical to build and maintain. The device is readily adaptable to any selected number of thermocouples, and without undue expense or time lost in the adaptation. The device is reliable and utilizes a simple resistance element with a small number of taps thereon compared with the complex resistance elements presently in use.

Changes may be made in the combination and arrangement of parts or elements heretofore set forth in the specification and shown in the drawings without departing from the spirit and scope of the following claims.

What is claimed is:

1. An apparatus for sampling a series of potentials comprising:
    a potentiometer having a resistance element and a contactor in electrical communication therewith;
    a plurality of taps spaced equally resistively along said resistance element;
    a plurality of switches, each of said switches having a plurality of contacts and an arm adapted to individually engage each of said contacts on said switch;
    operating means connected to the contactor of said potentiometer for moving said contactor;
    speed reducing coupling means having an input and an output, said input connected to said operating means, said output connected to each of the arms on said plurality of switches;
    means electrically connecting the arms of said switches sequently to said potentiometer taps;
    means for connecting each of said contacts on said switches to a plurality of potentials to be sampled, and
    a readout device connected to the contactor of said potentiometer.

2. A device as described in claim 1 wherein said switch arms are successively retarded one-fourth the arcuate distance between successive contacts.

3. A switching apparatus for sampling a plurality of related potentials comprising:
    a continuous substantially circular resistance element having a rotatable contactor in electrical communication therewith, said resistance element having a plurality of taps in electrical contact therewith and equally spaced about said resistance element;

rotating means connected to said rotatable contactor;

a plurality of switches, the number of said switches equaling the number of said taps, said switches each having a plurality of contacts and a rotating switch arm;

speed reduction means having an input connected to said rotating means and an output connected to said rotating switch arms;

means connecting said switch contacts to said related potentials, and means connecting said rotating switch arms to said taps, wherein the arrangement for connecting said switch contacts to said potentials and said switch arms to said taps shall be adapted to apply the potentials to said circular resistance in a predetermined order.

4. A potential sampling apparatus comprising:

a circular resistance element having a plurality of equally spaced taps and a rotating contactor;

a plurality of switches, each having a plurality of contacts and a movable switch arm;

operating means connected to said rotating contactor for rotating said contactor continuously through 360°;

speed reduction means connected between said operating means and said switch arms, said speed reduction means adapted to rotate said rotating contactor past all of said taps once before a switch arm moves from a point on a contact to a similar point on a successive contact;

means for connecting said switch arms to said taps;

means for connecting said switch contacts to said potentials to be sampled;

output means; and means for connecting said rotating contactor to said output means, whereby the output may be recorded as an analog of the successive sampled potentials.

5. In a device which is adapted to measure variations in temperature in the ocean, comprising: means adapted to record variations in temperature versus depth in the ocean; a plurality of thermocouples; means suspending said thermocouples substantially normal to the surface of the ocean and at predetermined depths in the ocean; means communicating the output of said thermocouples to the surface of the ocean; means for sequentially sampling the potential output of each of said thermocouples located progressively deeper in the ocean; and means for adapting said sampled potentials for application to said recording means; an improved thermocouple potential sampling means comprising:

a circular impedance element having a plurality of equally spaced taps thereabout, and a rotating contactor;

a plurality of switches, each having a plurality of contacts and a movable switch arm;

means connecting each of said switch arms to a single tap, the number of taps and switches being equal; and means for operating said rotating contactor and said switch arms, the relative movement between each being sufficient to move each of said switch arms from a point on a switch contact to a similar point on the next succeeding contact during a complete revolution of said contactor, said switch arms being rotated with respect to each other such that they are equally spaced along an arcuate distance between similar points on successive contacts.

References Cited by the Examiner

UNITED STATES PATENTS

| 2,474,192 | 6/49 | Schlesman | 73—341 |
| 2,579,831 | 12/51 | Keinath | 340—182 |
| 2,912,163 | 11/59 | Van Tuyl | 340—187 |

FOREIGN PATENTS 593,708  10/47  Great Britain.

ISAAC LISANN, *Primary Examiner.*